(12) United States Patent
Arndt et al.

(10) Patent No.: US 11,110,520 B2
(45) Date of Patent: Sep. 7, 2021

(54) FASTENER ALIGNMENT SYSTEMS, FASTENER ALIGNMENT KITS, AND ASSOCIATED METHODS

(71) Applicant: The Boeing Company, Chicago, IL (US)

(72) Inventors: Mitchel A. Arndt, Auburn, WA (US); David Michael Dembeck, Puyallup, WA (US); Daniel M. Sherick, Ravensdale, WA (US)

(73) Assignee: The Boeing Company, Chicago, IL (US)

( * ) Notice: Subject to any disclaimer, the term of this patent is extended or adjusted under 35 U.S.C. 154(b) by 530 days.

(21) Appl. No.: 16/101,235

(22) Filed: Aug. 10, 2018

(65) Prior Publication Data

US 2020/0047260 A1 Feb. 13, 2020

(51) Int. Cl.
*B23B 47/28* (2006.01)
*F16B 5/06* (2006.01)
*F16B 5/02* (2006.01)

(52) U.S. Cl.
CPC ........ *B23B 47/284* (2013.01); *B23B 2247/04* (2013.01); *B23B 2247/12* (2013.01); *F16B 5/0208* (2013.01); *F16B 5/0642* (2013.01)

(58) Field of Classification Search
CPC ......... B25B 11/00; B25B 11/02; B25B 23/02; B25B 23/08; B25B 23/10; B25B 23/103; B25C 3/00; B25C 3/006; B25C 3/008; B23Q 3/002; B23Q 3/005; B23Q 3/18; B23Q 3/186; B23Q 3/183; B23P 19/06; B23P 19/006; B23P 19/12; B23B 47/284; B23B 2247/04

USPC .................................................. 269/37, 45
See application file for complete search history.

(56) References Cited

U.S. PATENT DOCUMENTS

| | | | |
|---|---|---|---|
| 5,096,061 | A | 3/1992 | Wakai |
| 5,255,799 | A | 10/1993 | Haynes |
| 6,012,497 | A | 1/2000 | Stottmann |
| 6,637,606 | B1 | 10/2003 | Chen |
| 6,889,414 | B2 | 5/2005 | Korsedal |

(Continued)

OTHER PUBLICATIONS

U.S. Appl. No. 15/725,615, filed Oct. 5, 2017, Dembeck.

*Primary Examiner* — Tyrone V Hall, Jr.
*Assistant Examiner* — Abbie E Quann
(74) *Attorney, Agent, or Firm* — Dascenzo Gates Intellectual Property Law, P.C.

(57) ABSTRACT

Fastener alignment systems, fastener alignment kits, and associated methods are disclosed herein. The fastener alignment systems include a fastener orienting structure, a fastener alignment tool, and a transfer structure. The fastener orienting structure is configured to orient a plurality of fasteners in a predetermined fastening location pattern. The fastener alignment tool is configured to operatively engage with the fastener orienting structure at a predetermined relative orientation, to receive a corresponding fastener in each of a plurality of fastener alignment receptacles, and to retain the corresponding fastener. The transfer structure is configured to selectively transfer the plurality of fasteners from the fastener orienting structure to the fastener alignment tool. The fastener alignment kits include the fastener alignment tool and the plurality of fasteners. The methods include methods of utilizing the fastener alignment system.

20 Claims, 8 Drawing Sheets

(56) References Cited

U.S. PATENT DOCUMENTS

| | | | |
|---|---|---|---|
| 7,150,362 B1* | 12/2006 | Questiaux | B25H 3/04 |
| | | | 211/70.6 |
| 7,648,029 B2 | 1/2010 | Chen | |
| 8,776,354 B2* | 7/2014 | Herrmann | B23P 19/06 |
| | | | 29/525.11 |
| 10,207,333 B2* | 2/2019 | Nestleroad | B25H 7/02 |
| 2005/0017003 A1 | 1/2005 | Sullivan et al. | |
| 2005/0084344 A1 | 4/2005 | Dods et al. | |
| 2019/0105764 A1* | 4/2019 | Dembeck | B25B 23/005 |

* cited by examiner

FASTENER ALIGNMENT SYSTEMS, FASTENER ALIGNMENT KITS, AND ASSOCIATED METHODS

FIELD

The present disclosure relates generally to fastener alignment systems, to fastener alignment kits that include the fastener alignment systems, and/or to methods of aligning a plurality of fasteners.

BACKGROUND

During assembly of manufactured assemblies, a large number of fasteners may be utilized to retain various subassemblies thereof and/or to operatively attach two or more subassemblies together to form and/or define the manufactured assembly. Historically, installation of these fasteners has proceeded sequentially, with a technician installing a first fastener at a first predetermined fastener location and tightening the first fastener to a predetermined torque before proceeding to install a subsequent fastener at a subsequent predetermined fastener location. This process may be repeated hundreds, or even thousands, of times and may be quite time-consuming. In addition, and in certain applications, such as when the manufactured assemblies include aircraft, fastener installation may be spatially constrained and/or ergonomically challenging, making it difficult for the technician to install certain fasteners. In addition, loss of fasteners within the aircraft may be unacceptable. Thus, there exists a need for a fastener alignment system, a fastener alignment kit, and/or an associated method.

SUMMARY

Fastener alignment systems, fastener alignment kits, and associated methods are disclosed herein. The fastener alignment systems include a fastener orienting structure, a fastener alignment tool, and a transfer structure. The fastener orienting structure is configured to orient a plurality of fasteners in a predetermined fastening location pattern. The fastener alignment tool is configured to operatively engage with the fastener orienting structure at a predetermined relative orientation, to receive a corresponding fastener in each of a plurality of fastener alignment receptacles, and to retain the corresponding fastener. The transfer structure is configured to selectively transfer the plurality of fasteners from the fastener orienting structure to the fastener alignment tool. The fastener alignment kits include the fastener alignment tool and the plurality of fasteners.

The methods include orienting the plurality of fasteners on the fastener orienting structure and in the predetermined fastening location pattern. The methods also include operatively engaging a fastener alignment tool with the fastener orienting structure. The operatively engaging includes operatively engaging such that the plurality of fastener alignment receptacles of the fastener alignment tool is aligned with the plurality of fasteners. The methods further include transferring the plurality of fasteners from the fastener orienting structure to the fastener alignment tool. The transferring includes receiving and selectively retaining each fastener within a corresponding fastener alignment receptacle. The methods also include separating the fastener alignment tool from the fastener orienting structure while retaining the plurality of fasteners within the plurality of fastener alignment receptacles. The methods further include aligning the fastener alignment tool with a plurality of fastening locations arranged, on a manufactured assembly, in the predetermined fastening location pattern. The methods also include attaching the plurality of fasteners to the plurality of fastening locations.

DESCRIPTION

Figure 1:
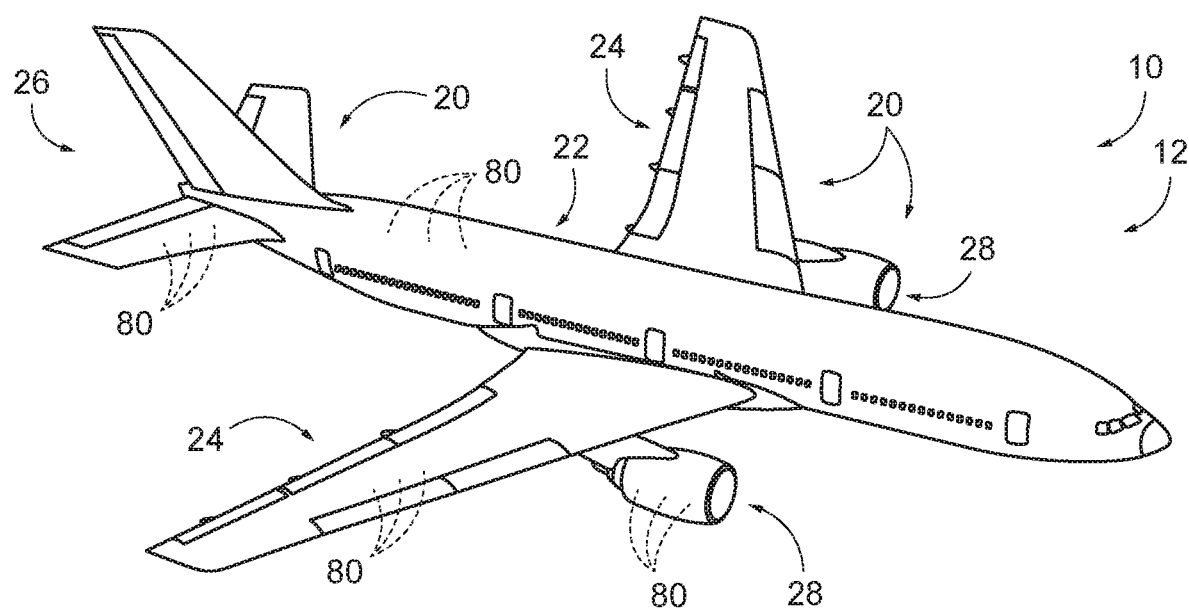
FIG. 1 is a schematic representation of a manufactured assembly that may be constructed utilizing the systems, kits, and/or methods, according to the present disclosure.

FIGS. 1-13 provide illustrative, non-exclusive examples of fastener alignment systems 100, of kits 200, and/or of methods 300, according to the present disclosure, and/or of manufactured assemblies that may be constructed utilizing systems 100, kits 200, and/or methods 300. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic representation of a manufactured assembly 10, in the form of an aircraft 12, that may be constructed utilizing systems 100, kits 200, and/or methods 300, according to the present disclosure. Manufactured assembly 10 may include a plurality of subassemblies 20, and these subassemblies may be internally assembled and/or may be operatively attached to one another utilizing a plurality of fasteners 80. As an example, and when manufactured assembly 10 includes aircraft 12, the aircraft may include an airframe 22, wings 24, a tail 26, and/or engines 28 that may be internally assembled with fasteners 80 and/or that may be operatively attached to one another and/or to at least one other component of manufactured assembly 10 utilizing fasteners 80.

Figure 2:
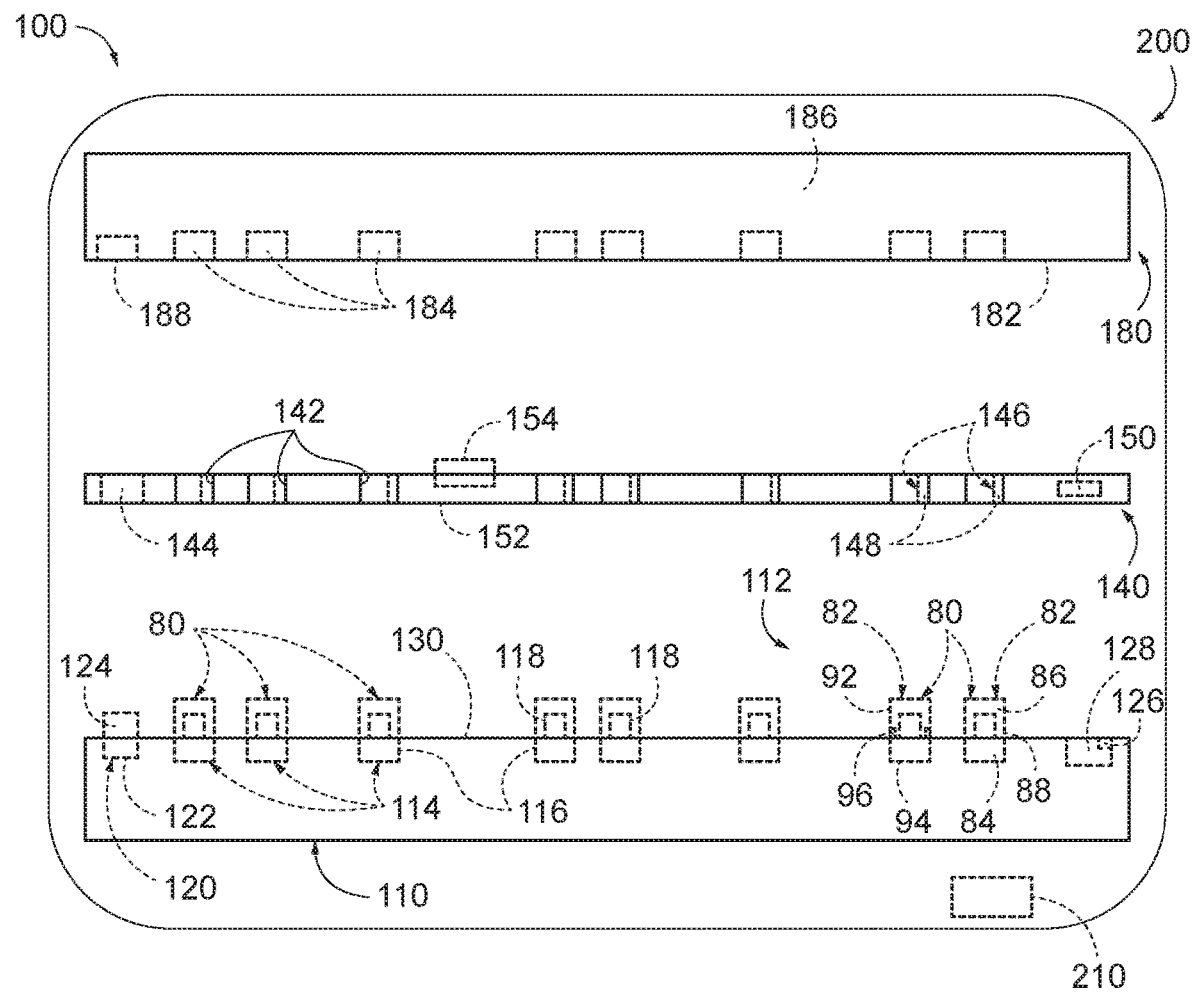
FIG. 2 is a schematic illustration of examples of a fastener alignment system according to the present disclosure.
Figure 3:
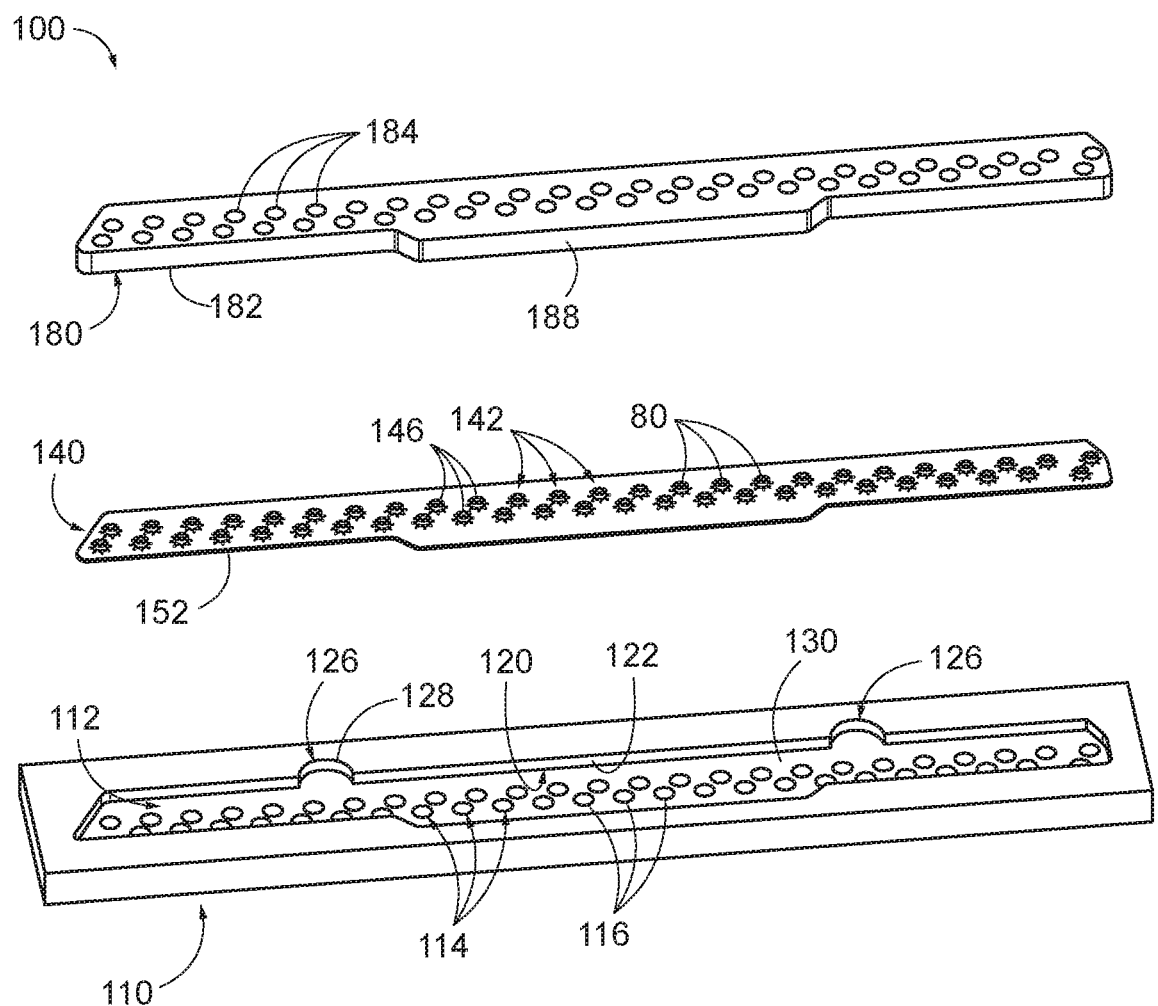
FIG. 3 is a less schematic illustration of a fastener alignment system according to the present disclosure.

FIG. 2 is a schematic illustration of examples of a fastener alignment system 100 according to the present disclosure. FIG. 3 is a less schematic illustration of an example of a fastener alignment system 100, according to the present disclosure.

As illustrated in FIGS. 2-3, fastener alignment systems 100 include a fastener orienting structure 110. As illustrated in FIG. 2, fastener orienting structure 110 is configured to orient and/or to facilitate arrangement of a plurality of fasteners 80 in a predetermined fastening location pattern 112 (e.g., the relative orientation and/or pattern of fasteners 80 on and/or relative to fastener orienting structure 110).

As illustrated in FIGS. 2-3, fastener alignment systems 100 also include a fastener alignment tool 140. Fastener alignment tool 140 is configured to operatively engage with fastener orienting structure 110 at a predetermined relative orientation (e.g., the predetermined relative orientation illustrated in FIG. 2). Fastener alignment tool 140 includes a plurality of fastener alignment receptacles 142 arranged in predetermined fastening location pattern 112. Each fastener alignment receptacle 142 is configured to receive and to selectively and/or at least temporarily retain, a corresponding fastener from fastener orienting structure 110. This is illustrated in FIG. 3, with fasteners 80 being received in fastener alignment receptacles 142 of fastener alignment tool 140 and also is discussed in more detail herein with reference to methods 300 and/or FIGS. 4-13.

Fastener alignment system 100 further includes a transfer structure 180. Transfer structure 180 is configured to selectively transfer, or to be utilized to selectively transfer, fasteners 80 from fastener orienting structure 110 to fastener alignment tool 140. This selective transfer may occur when fastener alignment tool 140 is operatively engaged with fastener orienting structure 110 at the predetermined relative orientation, as discussed in more detail herein with reference to methods 300 and/or FIGS. 4-13.

During operation of fastener alignment system 100, and as discussed in more detail herein with reference to methods 300 and/or FIGS. 4-13, fasteners 80 initially may be arranged on and/or relative to fastener orienting structure 110 in predetermined fastening location pattern 112. Subsequently, fastener alignment tool 140 may be operatively engaged with fastener orienting structure 110 and transfer structure 180 may be utilized to selectively transfer fasteners from fastener orienting structure 110 to fastener alignment tool 140 and/or to fastener alignment receptacles 142 of fastener alignment tool 140. Then, fastener alignment tool 140, together with retained fasteners 80 may be operatively engaged with a plurality of fastening locations arranged on a manufactured assembly and in predetermined fastening location pattern 112. As such, fastener alignment system 100 may facilitate engagement between fasteners 80 and the plurality of fastening locations in a manner that is more efficient and/or more ergonomic when compared to the manual fastener positioning of the prior art.

In one example, fasteners 80 may include a plurality of frangible collar nuts 82. Frangible collar nuts 82 may include a threaded region 84, an engagement region 86, and a frangible region 88. Threaded region 84 may define a threaded receptacle, or a female threaded region, configured for threaded engagement with a corresponding fastening location of the manufactured assembly. Engagement region 86 may be configured to engage, or to operatively engage, with a driver 210. As an example, engagement region 86 may include a conventional hexagonal body configured to engage with the driver; however, this specific shape is not required of all embodiments.

Frangible region 88 may extend between threaded region 84 and engagement region 86 and/or may operatively attach threaded region 84 and engagement region 86. Frangible region 88 may be configured to shear upon application of a predetermined torque between threaded region 84 and engagement region 86, such as may be applied when fasteners 80 are engaged with the fastening locations of the manufactured assembly utilizing driver 210.

Frangible collar nuts 82 may be referred to herein as including a first end region 92, a second end region 94, and a neck region 96. A neck diameter, or an effective neck diameter, of neck region 96 may be less than a first diameter, or a first effective diameter, of first end region 92. Similarly, the neck diameter may be less than a second diameter, or a second effective diameter, of second end region 94. Under these conditions, fastener alignment tool 140 may be configured to selectively retain fasteners 80 via operative engagement, e.g., a friction fit, with neck region 96. Additionally or alternatively, fastener alignment tool 140 may be configured to release each frangible collar nut 82 upon shearing of frangible region 88 and/or of neck region 96. This is discussed in more detail herein with reference to methods 300 and/or FIGS. 4-13.

Fastener orienting structure 110 may include any suitable structure that may be adapted, configured, designed, sized, and/or constructed to orient fasteners 80 in predetermined fastening location pattern 112. As an example, fastener orienting structure 110 may include a plurality of fastener orienting regions 114. Each fastener orienting region 114 may be configured to orient a corresponding fastener 80 at a corresponding location within the predetermined fastening location pattern. An example of fastener orienting regions 114 includes a plurality of fastener orienting receptacles 116 that may be sized to receive, or to at least partially receive, fasteners 80. Examples of fastener orienting receptacles 116 include any suitable opening, hole, aperture, and/or orifice that may be defined by and/or within fastener orienting structure 110. Another example of fastener orienting regions 114 includes a plurality of fastener orienting projections 118 that may be sized to extend, or to at least partially extend, within fasteners 80. Examples of fastener orienting projections 118 include any suitable pin, stud, bolt, and/or extension that may extend at least partially from a remainder of fastener orienting structure 110.

Fastener orienting structure 110 may include and/or be formed from any suitable material and/or materials. As examples, fastener orienting structure 110 may include and/or may be formed from one or more of a rigid material, a metal, and aluminum.

As illustrated in dashed lines in FIG. 2 and in solid lines in FIG. 3, fastener orienting structure 110 may include a fastener orienting structure index 120. Fastener orienting structure index 120, when present, may be configured to align fastener orienting structure 110 and fastener alignment tool 140 at the predetermined relative orientation. An example of fastener orienting structure index 120, which is illustrated in FIGS. 2-3, includes an indexing recess 122 that may be shaped to at least partially receive fastener alignment tool 140. Another example of fastener orienting structure index 120, which is illustrated in FIG. 2, includes an indexing projection 124 configured to operatively engage a corresponding index location 144 of fastener alignment tool 140.

As illustrated in dashed lines in FIG. 2 and in solid lines in FIG. 3, fastener orienting structure 110 also may include an access structure 126. Access structure 126, when present, may be configured to facilitate separation of fastener alignment tool 140 from fastener orienting structure 110 subsequent to transfer of fasteners 80 from the fastener orienting structure to the fastener alignment tool. An example of access structure 126 includes an access recess 128 configured to facilitate gripping of fastener alignment tool 140 by a user of fastener alignment system 100.

Fastener alignment tool 140 may include any suitable structure that includes fastener alignment receptacles 142, that receives fasteners 80 from fastener orienting structure 110, and/or that selectively retains fasteners 80. As an example, fastener alignment tool 140 may include a plurality of retention structures 146. Each retention structure 146 may be associated with a corresponding fastener alignment receptacle 142 and/or may be configured to selectively retain a corresponding fastener within the corresponding fastener alignment receptacle.

Retention structures 146 may include and/or be any suitable structure. As an example, retention structures 146 may include a plurality of resilient projections that project at least partially across the plurality of fastener alignment receptacles. Retention structures 146, when present, may be configured to deform, to deflect, to flex, and/or to bend to permit and/or to facilitate receipt of fasteners 80 within fastener alignment receptacles 142. Additionally or alternatively, retention structures 146 may be configured to frictionally retain fasteners 80 within fastener alignment receptacles 142.

As illustrated in dashed lines in FIG. 2, fastener alignment tool 140 may include indicia 150. Indicia 150, when present, may be configured to indicate a location, within the manufactured assembly, that includes the plurality of fastening locations arranged in the predetermined fastening location pattern. Stated another way, indicia 150 may indicate, to a user of fastener alignment system 100 and/or of fastener alignment tool 140, wherein, within the manufactured assembly, fastener alignment tool 140 may be utilized to align fasteners 80 with the plurality of fastening locations arranged in the predetermined fastening location pattern.

Indicia 150 may include and/or be visual indicia. Stated another way, indicia 150 may visually identify the location within the manufactured assembly. Examples of visual indicia include a color code that identifies, or that is associated with, the location within the manufactured assembly, a numbering scheme that identifies, or that is associated with, the location within the manufactured assembly, and/or text that identifies, or that is associated with, the location within the manufactured assembly.

Additionally or alternatively, indicia 150 may include and/or be physical indicia. Stated another way, indicia 150 may physically identify the location within the manufactured assembly and/or may physically constrain wherein fastener alignment tool 140 may be positioned within the manufactured assembly. An example of physical indicia includes an outer perimeter, an external shape, and/or an overall shape of fastener alignment tool 140. As an example, the outer perimeter, the external shape, and/or the overall shape of fastener alignment tool 140 may correspond to a shape, or an overall shape, of the location within the manufactured assembly.

It is within the scope of the present disclosure that fastener alignment tool 140 may be positioned, relative to the location within the manufactured assembly, in a two-step process that includes both coarse, general, and/or rough, and fine, precision, and/or more precise, alignment. As an example, indicia 150 may provide coarse alignment of fastener alignment tool 140 relative to the manufactured assembly and/or relative to the location within the manufactured assembly. Subsequently, engagement, or initial engagement, between fasteners 80 and the plurality of fastening locations may provide fine alignment of fastener alignment tool 140 relative to the manufactured assembly and/or relative to the location within the manufactured assembly.

As illustrated in dashed lines in FIG. 2 and in solid lines in FIG. 3, fastener orienting structure 110 may include and/or may define a fastener orienting structure surface 130, and fasteners 80 may be oriented in predetermined fastening location pattern 112 on, within, and/or relative to the fastener orienting structure surface. Fastener orienting structure surface 130 may include and/or be a planar fastener orienting structure surface.

Similarly, as illustrated in dashed lines in FIG. 2 and in solid lines in FIG. 3, fastener alignment tool 140 may include and/or may define a fastener alignment tool surface 152 that may be configured to face toward the manufactured assembly when the fastener alignment tool operatively engages fasteners 80 with the plurality of fastening locations on the manufactured assembly. Fastener alignment tool surface 152 may include and/or be a planar fastener alignment tool surface.

As discussed, fastener alignment tool 140 is configured to operatively engage with fastener orienting structure 110, such as to permit and/or to facilitate transfer of fasteners 80 from fastener orienting structure 110 and/or to fastener alignment tool 140. During this operative engagement, fastener orienting structure surface 130 may face toward fastener alignment tool surface 152. Additionally or alternatively, and when fastener alignment tool 140 is operatively engaged with fastener orienting structure 110 at the predetermined relative orientation, each fastener 80 may be aligned with a corresponding fastener alignment receptacle 142.

As illustrated in dashed lines in FIG. 2, fastener alignment tool 140 may include a separation structure 154. Separation structure 154, when present, may be configured to facilitate separation of fastener alignment tool 140 from fastener orienting structure 110 subsequent to transfer of fasteners 80 from fastener orienting structure 110 to fastener alignment tool 140. An example of separation structure 154 includes a handle configured to be gripped by the user of the fastener alignment system 100.

Fastener alignment tool 140 may be formed from and/or may include any suitable material and/or materials. As examples, fastener alignment tool 140 may include and/or may be formed from one or more of a resilient material, a flexible material, a polymeric material, and/or a phenolic material.

Transfer structure 180 may include any suitable structure that may, or that may be utilized to, selectively transfer fasteners 80 from fastener orienting structure 110 to fastener alignment tool 140 when fastener alignment tool 140 is operatively engaged with fastener orienting structure 110 at the predetermined relative orientation. In addition, transfer structure 180 may accomplish and/or facilitate the transfer of fasteners 80 in any suitable manner. As an example, transfer structure 180 may be configured to selectively press fastener alignment tool 140 and fastener orienting structure 110 toward one another to selectively transfer fasteners 80 from fastener orienting structure 110 to fastener alignment tool 140. Stated another way, transfer structure 180 may be configured to be selectively pressed against fastener alignment tool 140 to press fastener alignment tool 140 against fastener orienting structure 110 and/or to facilitate transfer of fasteners 80 to fastener alignment tool 140. This selectively pressing may be facilitated and/or accomplished by a user of fastener alignment system 100, such as via utilizing the user's hands, a mechanical press, an arbor press, and/or a hydraulic press. Transfer structure 180 also may be referred to herein as a transfer plate 180 and/or as a press plate 180.

Transfer structure 180 may be configured to elastically deform at least a portion of fastener alignment tool 140 to facilitate transfer of fasteners 80 from fastener orienting structure 110 to fastener alignment tool 140. As an example, retention structures 146 of fastener alignment tool 140 may elastically deform during the transfer.

It is within the scope of the present disclosure that transfer structure 180 may be configured to simultaneously, or at least simultaneously, transfer all fasteners 80 from fastener orienting structure 110 to fastener alignment tool 140. Under these conditions, transfer structure 180 may be rigid, or at least substantially rigid, and/or may simultaneously contact an entirety of fastener alignment tool 140. As an example, transfer structure 180 may include and/or be a rigid transfer plate.

It is also within the scope of the present disclosure that transfer structure 180 may be flexible and/or compliant. In such a configuration, transfer structure 180 may be configured to deform, to elastically deform, and/or to conform to a shape of fasteners 80 and/or of fastener alignment tool 140 during transfer of the fasteners from fastener orienting structure 110 to the fastener alignment tool. Such a flexible and/or compliant transfer structure 180 may transfer fasteners 80 sequentially and/or simultaneously and may be formed from and/or may include a flexible material, a polymeric material, a rubber, a foam, and/or a urethane.

Additionally or alternatively, transfer structure 180 may include a transfer surface 182 configured to press against fastener alignment tool 140, or against an entirety of a surface of fastener alignment tool 140, to selectively transfer fasteners 80. Transfer surface 182 may include and/or be a planar, or at least substantially planar, transfer surface.

As illustrated in dashed lines in FIG. 2, and in solid lines in FIG. 3, transfer structure 180 may include a plurality of transfer structure recesses 184. Transfer structure recesses 184 may be arranged in predetermined fastening location pattern 112 and may be shaped to receive, or to at least partially receive, fasteners 80 during transfer of fasteners 80 from fastener orienting structure 110 to fastener alignment tool 140. Such a configuration may permit and/or facilitate fasteners 80 extending through, or entirely through, fastener alignment receptacles 142 upon transfer of fasteners 80 to fastener alignment tool 140.

It also is within the scope of the present disclosure that transfer structure 180 may be configured to sequentially transfer fasteners 80 from fastener orienting structure 110 to fastener alignment tool 140. As an example, transfer structure 180 may include a transfer roller 186 configured to press against fastener alignment tool 140, or against a region of fastener alignment tool 140, to transfer fasteners 80 from fastener orienting structure 110 to fastener alignment tool 140. Examples of transfer roller 186 include a rigid transfer roller and/or a flexible transfer roller.

As illustrated in dashed lines in FIG. 2 and in solid lines in FIG. 3, transfer structure 180 may include a transfer structure index 188. Transfer structure index 188, when present, may be configured to align transfer structure 180 with fastener alignment tool 140 during transfer of fasteners 80 from fastener orienting structure 110 to fastener alignment tool 140. Transfer structure index 188 may define a predetermined transfer orientation between transfer structure 180 and fastener alignment tool 140.

As illustrated in FIG. 2, fastener alignment system 100, including fastener orienting structure 110, fastener alignment tool 140, and transfer structure 180 thereof, may be combined with fasteners 80. Under these conditions, the combination of fastener alignment system 100 and fasteners 80 may be referred to herein as a kit 200 and/or as a kit 200 of components configured to operatively engage a plurality of fasteners 80 with a corresponding plurality of fastening locations arranged in a predetermined fastening location pattern 112 on a manufactured assembly 10. Such a kit 200 also may include driver 210, which may be utilized to affix fasteners 80 to corresponding fastening locations, as discussed in more detail herein with reference to methods 300 and/or to FIGS. 4-13. Examples of driver 210 include a nut driver, a right angle nut driver, a right angle driver, an electric driver, and/or a pneumatic driver.

Figure 4:
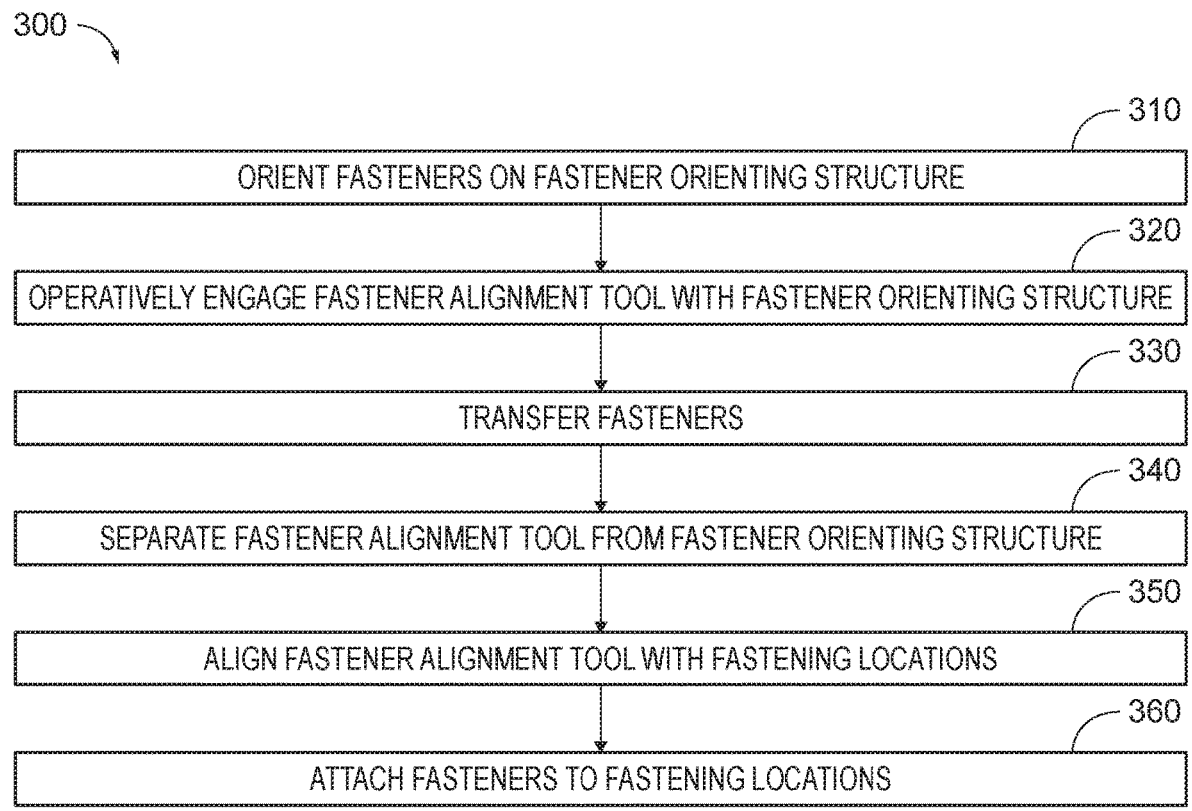
FIG. 4 is a flowchart depicting methods, according to the present disclosure, of aligning a plurality of fasteners with a plurality of fastening locations.

FIG. 4 is a flowchart depicting methods 300, according to the present disclosure, of aligning a plurality of fasteners 80 with a plurality of fastening locations. FIGS. 5-13 are schematic illustrations of examples of portions of the method of FIG. 4. The plurality of fastening locations may be arranged in a predetermined fastening location pattern 112 and/or on a manufactured assembly 10, such as an aircraft 12.

Methods 300 include orienting fasteners 80 on a fastener orienting structure 110 at 310 and operatively engaging a fastener alignment tool 140 with the fastener orienting structure 110 at 320. Methods 300 also include transferring the fasteners 80 at 330 and separating the fastener alignment tool 140 from the fastener orienting structure 110 at 340. Methods 300 further include aligning the fastener alignment tool 140 with fastening locations 30 at 350 and attaching the fasteners 80 to the fastening locations 30 at 360.

Orienting fasteners 80 on fastener orienting structure 110 at 310 may include orienting a plurality of fasteners 80 on the fastener orienting structure 110 and/or in predetermined fastening location pattern 112. Examples of the fastener orienting structure are illustrated in FIGS. 2-3 at 110 and discussed in more detail herein with reference thereto.

Figure 5:
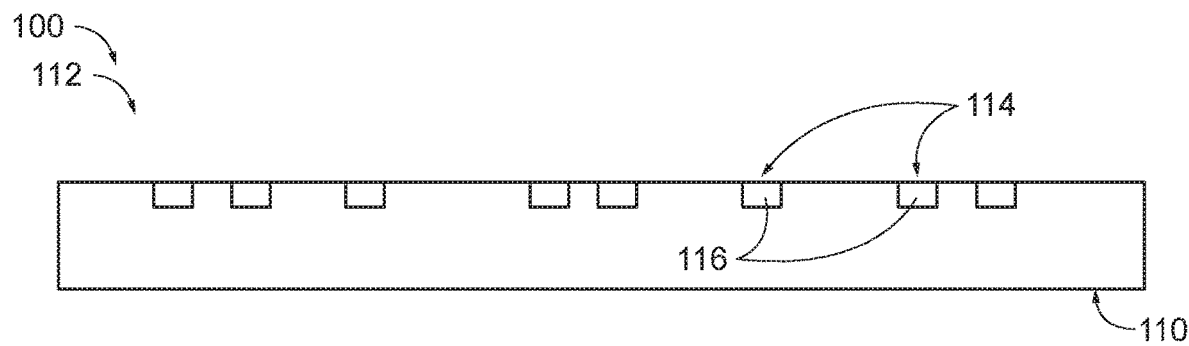
FIG. 5 is a schematic illustration of an example of a portion of the method of FIG. 4.
Figure 6:
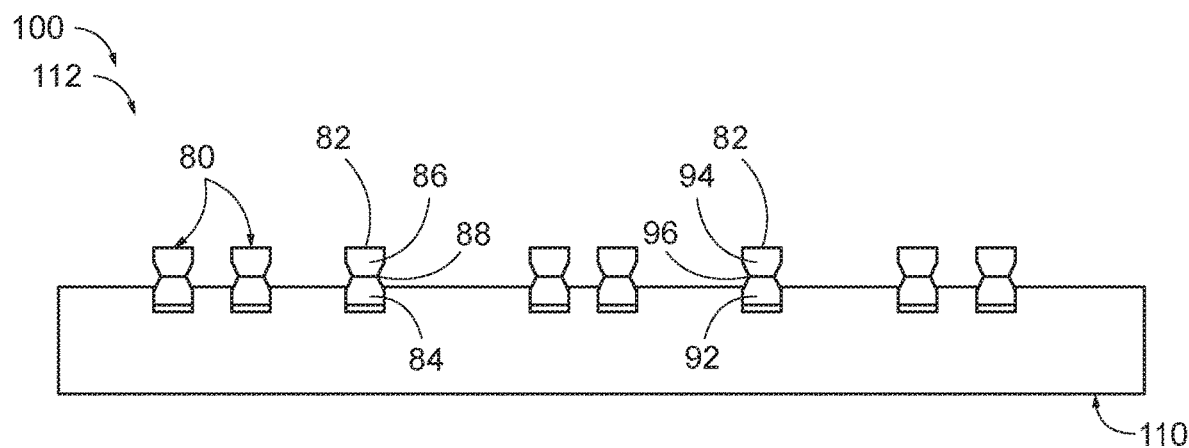
FIG. 6 is a schematic illustration of an example of a portion of the method of FIG. 4.

An example of the orienting at 310 is illustrated in FIGS. 5-6. As illustrated in FIG. 5, a fastener orienting structure 110 may include a plurality of fastener orienting regions 114, such as a plurality of fastener orienting receptacles 116, arranged in a predetermined fastening location pattern 112. As illustrated in FIG. 6, the orienting at 310 may include placing a corresponding fastener 80 at each fastener orienting region 114 and/or within each fastener orienting receptacle 116. Additionally or alternatively, and as discussed herein with reference to FIG. 2, the plurality of fastener orienting regions 114 may include a plurality of fastener orienting projections 118. Under these conditions, the orienting at 310 may include placing the corresponding fastener 80 at least partially around each fastener orienting projection 118.

As discussed herein with reference to FIG. 2, fasteners 80 may include a plurality of frangible collar nuts 82. Each frangible collar nut 82 may include a threaded region 84, an engagement region 86, and a frangible region 88. Additionally or alternatively, each frangible collar nut 82 may be referred to herein as having a first end region 92, a second end region 94, and a neck region 96 with a diameter that is smaller than a diameter of the first end region and/or of the second end region.

Fastener alignment tool 140 may include a plurality of fastener alignment receptacles 142 arranged in predetermined fastening location pattern 112. Under these conditions, operatively engaging fastener alignment tool 140 with fastener orienting structure 110 at 320 may include operatively engaging such that the plurality of fastener alignment receptacles 142 is aligned with the plurality of fasteners 80. The operatively engaging at 320 may include operatively engaging at a predetermined relative orientation between fastener alignment tool 140 and fastener orienting structure 110. Examples of the fastener alignment tool are illustrated in FIGS. 2 and 4 at 140 and discussed in more detail herein with reference thereto.

Figure 7:
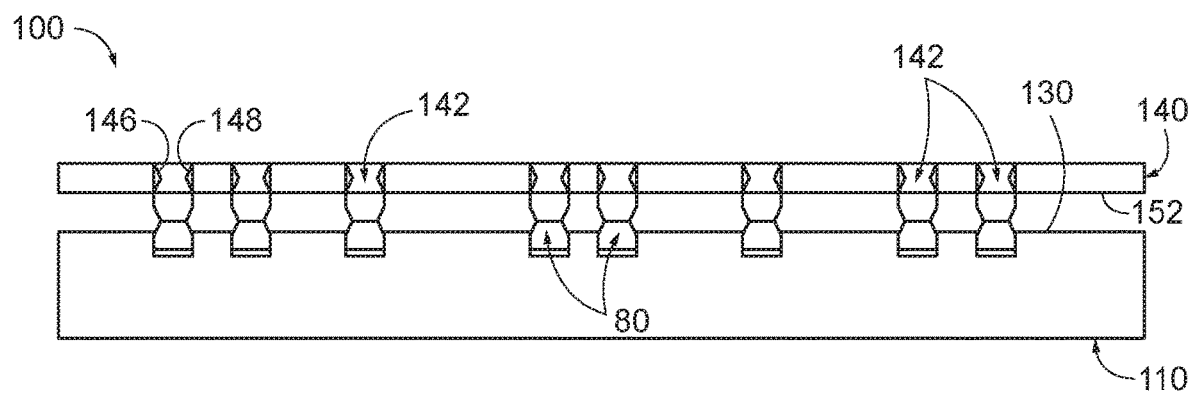
FIG. 7 is a schematic illustration of an example of a portion of the method of FIG. 4.

An example of the operatively engaging at 320 is illustrated in FIG. 7. As illustrated therein, fastener alignment tool 140 may be operatively engaged with fastener orienting structure 110. This operative engagement may be at the predetermined relative orientation between fastener alignment tool 140 and fastener orienting structure 110 and/or may be such that a location of fasteners 80 on fastener orienting structure 110 corresponds to a location of fastener alignment receptacles 142 of fastener alignment tool 140. Additionally or alternatively, this operative engagement at least initially may be with fasteners 80 that are arranged on fastener orienting structure 110. As discussed herein, fastener orienting structure 110 may include a fastener orienting structure surface 130 and fastener alignment tool 140 may include a fastener alignment tool surface 152. Under these conditions, the operatively engaging at 320 may include operatively engaging such that fastener alignment tool surface 152 faces toward fastener orienting structure surface 130.

Transferring the fasteners at 330 may include transferring the plurality of fasteners 80 from fastener orienting structure 110 to fastener alignment tool 140. The transferring at 330 may include receiving each fastener 80 in the plurality of fasteners 80 within a corresponding fastener alignment receptacle 142 in the plurality of fastener alignment receptacles 142. The transferring at 330 also may include selectively retaining each fastener 80 within the corresponding fastener alignment receptacle 142. The transferring at 330 may be accomplished and/or facilitated with, via, and/or utilizing a transfer structure 180. Examples of the transfer structure are illustrated in FIGS. 2-3 at 180 and discussed in more detail herein with reference thereto.

Figure 8:
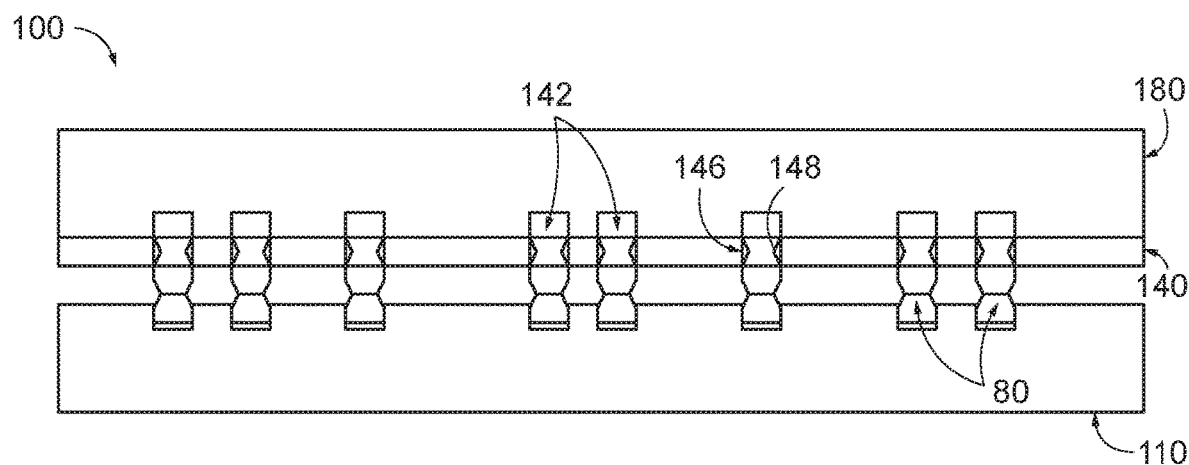
FIG. 8 is a schematic illustration of an example of a portion of the method of FIG. 4.
Figure 9:
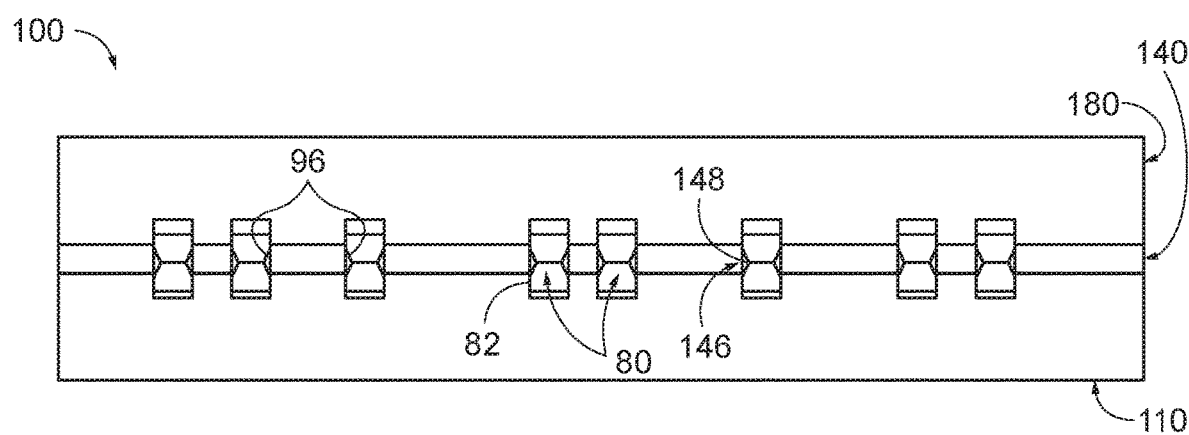
FIG. 9 is a schematic illustration of an example of a portion of the method of FIG. 4.

An example of the transferring at 330 is illustrated in FIGS. 8-9, and the transferring at 330 may utilize a transfer structure 180. As illustrated in FIG. 8, the transferring at 330 initially may include arranging transfer structure 180 such that the transfer structure 180 operatively engages with fastener alignment tool 140 and/or such that the fastener alignment tool extends between the transfer structure 180 and fastener orienting structure 110. As illustrated by the transition from FIG. 8 to FIG. 9, the transferring at 330 also may include pressing fastener orienting structure 110 and fastener alignment tool 140 toward one another, such as with, via, and/or utilizing transfer structure 180. This pressing may cause fasteners 80 to move into, to be transferred into, and/or to be retained within fastener alignment receptacles 142 of fastener alignment tool 140.

The transferring at 330 also may include deforming, or elastically deforming, at least a region of fastener alignment tool 140 to facilitate the selectively retaining of fasteners 80 by the fastener alignment tool 140. As an example, fastener alignment tool 140 may include retention structures 146, such as resilient projections 148, that may be deformed, or elastically deformed, during the separating at 340 and/or to facilitate the selective retention of fasteners 80. As discussed in more detail herein, fasteners 80 may include frangible collar nuts 82 and/or may include neck region 96. Under these conditions, retention structures 146 may operatively engage with neck regions 96 to selectively retain fasteners 80 within fastener alignment receptacles 142 of fastener alignment tool 140.

Separating fastener alignment tool 140 from fastener orienting structure 110 at 340 may include separating while retaining the plurality of fasteners 80 within the plurality of fastener alignment receptacles 142. Stated another way, and subsequent to the separating at 340, the plurality of fasteners may be retained by and/or within the fastener alignment tool 140 and/or may be spaced-apart and/or spatially separated from the fastener orienting structure 110. The separating at 340 may be accomplished in any suitable manner. As an example, the separating at 340 may include moving the fastener alignment tool 140 and the fastener orienting structure 110 away from one another.

Figure 10:
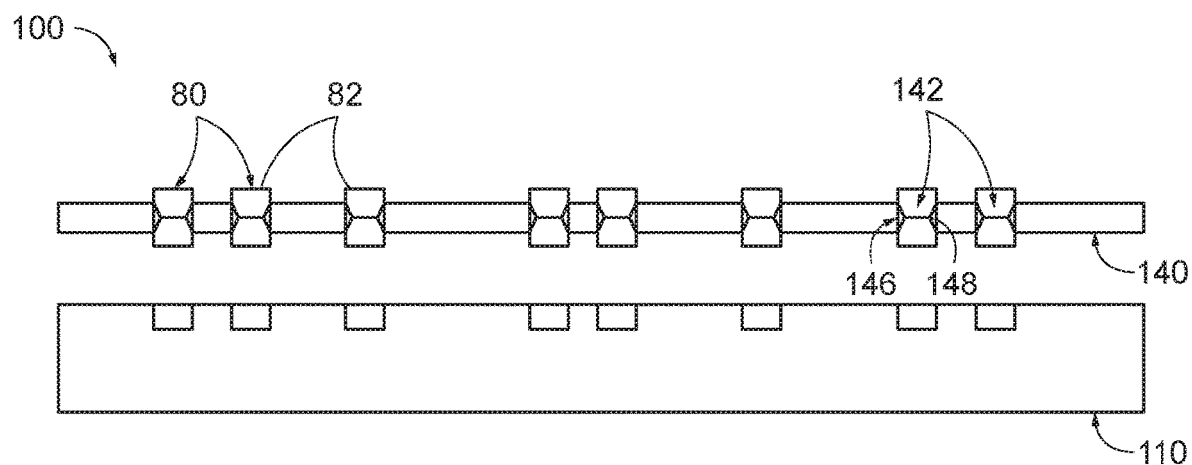
FIG. 10 is a schematic illustration of an example of a portion of the method of FIG. 4.

The separating at 340 is illustrated by the transition from FIG. 9 to FIG. 10. As illustrated in FIG. 10, and subsequent to the separating at 340, fastener alignment tool 140 and fastener orienting structure 110 are spaced-apart from one another. However, and as also illustrated in FIG. 10, fasteners 80 are retained within fastener alignment receptacles 142 of fastener alignment tool 140.

Aligning fastener alignment tool 140 with the fastening locations at 350 may include contacting, or physically contacting, the plurality of fasteners 80 with the plurality of fastening locations 30. Stated another way, the aligning at 350 may include aligning each fastener 80 in the plurality of fasteners 80 with a corresponding fastening location 30 in the plurality of fastening locations 30 and/or contacting, or physically contacting, each fastener 80 with the corresponding fastening location 30.

Figure 11:
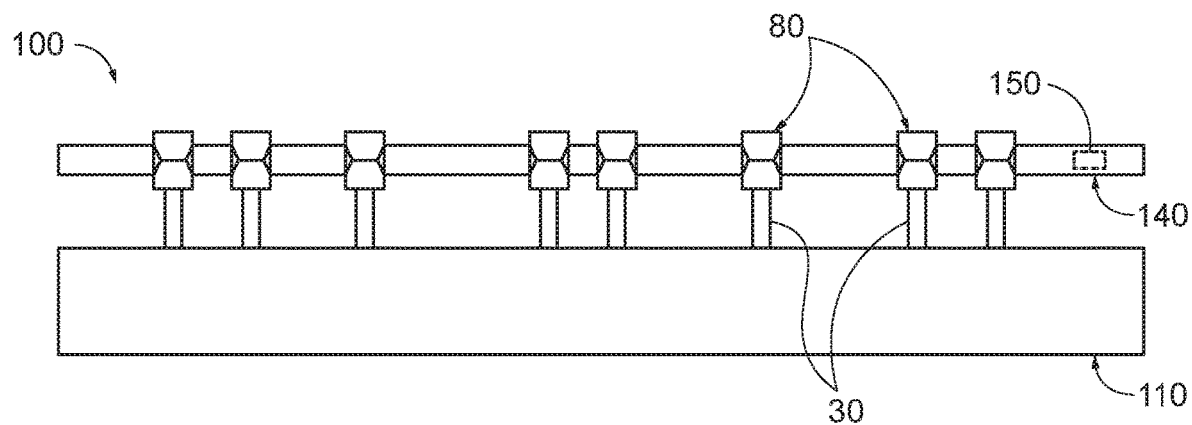
FIG. 11 is a schematic illustration of an example of a portion of the method of FIG. 4.

The aligning at 350 is illustrated in FIG. 11. As illustrated therein, the aligning at 350 may include aligning fastener alignment tool 140 with a plurality of fastening locations 30 of a manufactured assembly 10. As also illustrated in FIG. 11, fastener alignment tool 140 may include indicia 150, which may be configured to indicate a location within manufactured assembly 10 that includes the plurality of fastening locations 30. Under these conditions, the aligning at 350 may include aligning, or coarse aligning, fastener alignment tool 140 with manufactured assembly 10 with, via, and/or utilizing indicia 150. Examples of indicia 150 are discussed in more detail herein with reference to FIG. 2.

The aligning at 350 additionally or alternatively may include aligning, or fine aligning, fastener alignment tool 140 with manufactured assembly 10 with, via, and/or utilizing engagement, initial engagement, and/or contact between fasteners 80 and fastening locations 30. When fastener alignment tool 140 includes indicia 150, initial and/or coarse alignment may be performed utilizing indicia 150, while subsequent and/or fine alignment may be performed utilizing contact between fasteners 80 and fastening locations 30.

Attaching the fasteners 80 to the fastening locations 30 at 360 may include operatively engaging each fastener 80 with the corresponding fastening location 30. This may include tightening the fasteners 80 onto and/or into the plurality of fastening locations 30. Additionally or alternatively, this may include rotating the plurality of fasteners 80 to attach the plurality of fasteners 80 to the plurality of fastening locations 30.

The attaching at 360 may be accomplished in any suitable manner. As an example, the attaching at 360 may include attaching with, via, and/or utilizing a driver. Examples of the driver are disclosed herein with reference to driver 210 of FIG. 2.

Figure 12:
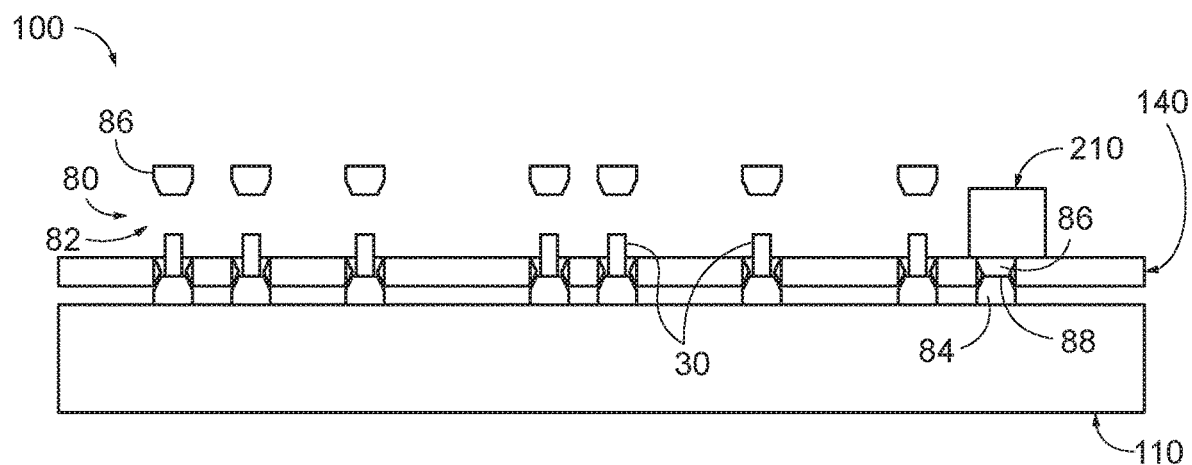
FIG. 12 is a schematic illustration of an example of a portion of the method of FIG. 4.
Figure 13:
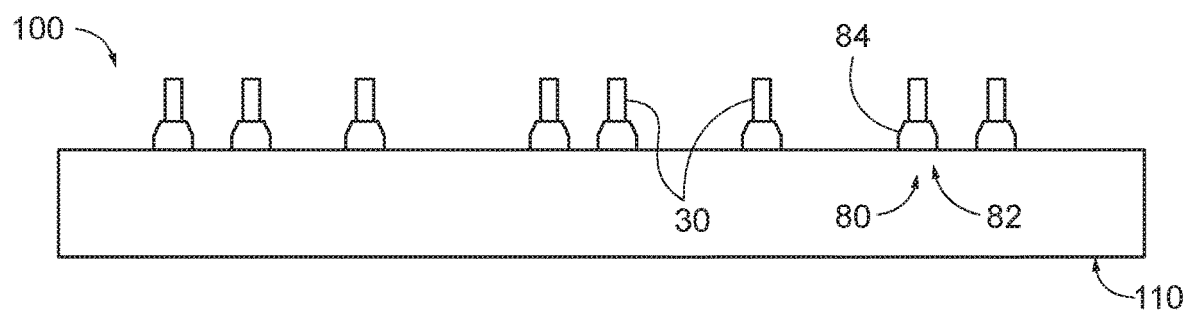
FIG. 13 is a schematic illustration of an example of a portion of the method of FIG. 4.

An example of the attaching at 360 is illustrated in FIGS. 12-13. As illustrated therein, fasteners 80 may be attached to fastening locations 30. As discussed, fasteners 80 may include frangible collar nuts 82 that may include threaded regions 84, engagement regions 86, and frangible regions 88. Under these conditions, the attaching at 360 may include rotating each fastener 80 to thread threaded region 84 of each fastener 80 onto a corresponding fastening location 30. This rotation may be via engagement with engagement region 86 and/or via engagement between driver 210 and engagement region 86. When this rotation provides greater than a threshold torque between engagement region 86 and threaded region 84, the attaching at 360 further may include shearing frangible region 88, thereby bringing about separation of threaded region 84 and engagement region 86. This shearing and/or separation may permit and/or facilitate separation of fastener alignment tool 140 from fasteners 80. Thus, and subsequent to each fastener 80 being attached to the corresponding fastening location 30, fastener alignment tool 140 readily may be separated from the fasteners 80 and/or from threaded region 84 of the fasteners 80, as illustrated by the transition from FIG. 12 to FIG. 13. Stated another way, the attaching at 360 further may include releasing each fastener 80 from the fastener alignment tool 140, with this releasing being responsive to the shearing of each fastener 80.

Illustrative, non-exclusive examples of inventive subject matter according to the present disclosure are described in the following enumerated paragraphs:

A1. A fastener alignment system comprising:

a fastener orienting structure configured to orient a plurality of fasteners in a predetermined fastening location pattern;

a fastener alignment tool configured to operatively engage with the fastener orienting structure at a predetermined relative orientation, wherein the fastener alignment tool includes a plurality of fastener alignment receptacles arranged in the predetermined fastening location pattern, wherein each fastener alignment receptacle is configured to:

(i) receive a corresponding fastener in the plurality of fasteners from the fastener orienting structure; and (ii) selectively retain the corresponding fastener; and a transfer structure configured to selectively transfer the plurality of fasteners from the fastener orienting structure to the fastener alignment tool when the fastener alignment tool is operatively engaged with the fastener orienting structure at the predetermined relative orientation;

wherein, subsequent to receipt of the plurality of fasteners, the fastener alignment tool is configured to operatively engage the plurality of fasteners with a corresponding plurality of fastening locations arranged, on a manufactured assembly, in the predetermined fastening location pattern.

A2. The fastener alignment system of paragraph 1, wherein the fastener orienting structure includes a plurality of fastener orienting regions, wherein each of the plurality of fastener orienting regions is configured to orient a corresponding fastener of the plurality of fasteners at a corresponding location within the predetermined fastening location pattern.

A3. The fastener alignment system of paragraph A2, wherein the plurality of fastener orienting regions includes a plurality of fastener orienting receptacles sized to at least partially receive the plurality of fasteners.

A4. The fastener alignment system of any of paragraphs A2-A3, wherein the plurality of fastener orienting regions includes a plurality of fastener orienting projections sized to at least partially extend within the plurality of fasteners.

A5. The fastener alignment system of any of paragraphs A1-A4, wherein the fastener orienting structure further includes a fastener orienting structure index configured to align the fastener orienting structure and the fastener alignment tool at the predetermined relative orientation.

A6. The fastener alignment system of paragraph A5, wherein the fastener orienting structure index includes at least one of:

(i) an indexing recess shaped to at least partially receive the fastener alignment tool at the predetermined relative orientation when the fastener orienting structure and the fastener alignment tool are operatively engaged at the predetermined relative orientation; and (ii) an indexing projection configured to operatively engage with a corresponding index location of the fastener alignment tool when the fastener orienting structure and the fastener alignment tool are operatively engaged at the predetermined relative orientation.

A7. The fastener alignment system of any of paragraphs A1-A6, wherein the fastener orienting structure further includes an access structure configured to facilitate separation of the fastener alignment tool from the fastener orienting structure subsequent to transfer of the plurality of fasteners from the fastener orienting structure to the fastener alignment tool.

A8. The fastener alignment system of paragraph A7, wherein the access structure includes an access recess configured to facilitate gripping of the fastener alignment tool by a user of the fastener alignment system.

A9. The fastener alignment system of any of paragraphs A1-A8, wherein the fastener orienting structure is formed from at least one of:

(i) a rigid material;

(ii) a metal; and (iii) aluminum.

A10. The fastener alignment system of any of paragraphs A1-A9, wherein the fastener alignment tool includes a plurality of retention structures, wherein each retention structure in the plurality of retention structures is associated with a corresponding fastener alignment receptacle of the plurality of fastener alignment receptacles and is configured to selectively retain the corresponding fastener within the corresponding fastener alignment receptacle.

A11. The fastener alignment system of paragraph A10, wherein the plurality of retention structures includes a plurality of resilient projections that project at least partially across the plurality of fastener alignment receptacles.

A12. The fastener alignment system of any of paragraphs A10-A11, wherein the plurality of retention structures is configured to deform to permit receipt of the plurality of fasteners within the plurality of fastener alignment receptacles.

A13. The fastener alignment system of any of paragraphs A10-A12, wherein the plurality of retention structures is configured to frictionally retain the plurality of fasteners within the plurality of fastener alignment receptacles.

A14. The fastener alignment system of any of paragraphs A1-A13, wherein the fastener alignment tool includes indicia configured to indicate a location, within the manufactured assembly, that includes the plurality of fastening locations.

A15. The fastener alignment system of paragraph A14, wherein the indicia includes visual indicia.

A16. The fastener alignment system of paragraph A15, wherein the visual indicia includes at least one of:
 (i) a color code that identifies the location within the manufactured assembly;
 (ii) a numbering scheme that identifies the location within the manufactured assembly; and
 (iii) text that identifies the location within the manufactured assembly.

A17. The fastener alignment system of any of paragraphs A14-A16, wherein the indicia includes a physical indicia.

A18. The fastener alignment system of paragraph A17, wherein the physical indicia includes an outer perimeter of the fastener alignment tool.

A19. The fastener alignment system of paragraph A18, wherein an overall shape of the fastener alignment tool corresponds to an overall shape of the location within the manufactured assembly.

A20. The fastener alignment system of any of paragraphs A14-A19, wherein the indicia is configured to facilitate coarse alignment between the fastener alignment tool and the location within the manufactured assembly.

A21. The fastener alignment system of paragraph A20, wherein initial engagement between the plurality of fasteners and the plurality of fastening locations provides fine alignment between the fastener alignment tool and the location within the manufactured assembly.

A22. The fastener alignment system of paragraphs A1-A22, wherein the fastener orienting structure includes a fastener orienting structure surface and is configured to orient the plurality of fasteners in the predetermined fastening location pattern relative to the fastener orienting structure surface, optionally wherein the fastener orienting structure surface is a planar fastener orienting structure surface.

A23. The fastener alignment system of any of paragraphs A1-A22, wherein the fastener alignment tool includes a fastener alignment tool surface configured to face toward the manufactured assembly when the fastener alignment tool operatively engages the plurality of fasteners with the plurality of fastening locations on the manufactured assembly, optionally wherein the fastener alignment tool surface is a planar fastener alignment tool surface.

A24. The fastener alignment system of paragraph A23 when dependent from paragraph A22, wherein, during transfer of the plurality of fasteners from the fastener orienting structure to the fastener alignment tool, the fastener orienting structure surface faces toward the fastener alignment tool surface.

A25. The fastener alignment system of any of paragraphs A1-A24, wherein, when the fastener alignment tool is operatively engaged with the fastener orienting structure at the predetermined relative orientation, each fastener in the plurality of fasteners is aligned with a corresponding fastener alignment receptacle in the plurality of fastener alignment receptacles.

A26. The fastener alignment system of any of paragraphs A1-A25, wherein the fastener alignment tool includes a separation structure configured to facilitate separation of the fastener alignment tool from the fastener orienting structure subsequent to transfer of the plurality of fasteners from the fastener orienting structure to the fastener alignment tool.

A27. The fastener alignment system of paragraph A26, wherein the separation structure includes a handle configured to be gripped by a/the user of the fastener alignment system.

A28. The fastener alignment system of any of paragraphs A1-A27, wherein the fastener alignment tool is formed from at least one of:
 (i) a resilient material;
 (ii) a flexible material;
 (iii) a polymeric material; and
 (iv) a phenolic material.

A30. The fastener alignment system of any of paragraphs A1-A29, wherein the transfer structure is configured to selectively press the fastener alignment tool and the fastener orienting structure toward one another to selectively transfer the plurality of fasteners from the fastener orienting structure to the fastener alignment tool.

A31. The fastener alignment system of any of paragraphs A1-A30, wherein the transfer structure is configured to elastically deform at least a portion of the fastener alignment tool to selectively transfer the plurality of fasteners from the fastener orienting structure to the fastener alignment tool.

A32. The fastener alignment system of any of paragraphs A1-A31, wherein the transfer structure is configured to at least one of:
 (i) simultaneously transfer all fasteners in the plurality of fasteners from the fastener orienting structure to the fastener alignment tool; and
 (ii) sequentially transfer the plurality of fasteners from the fastener orienting structure to the fastener alignment tool.

A33. The fastener alignment system of any of paragraphs A1-A32, wherein the transfer structure includes a rigid transfer structure including a transfer surface configured to press against the fastener alignment tool to selectively transfer the plurality of fasteners from the fastener orienting structure to the fastener alignment tool, optionally wherein the transfer surface is an at least substantially planar transfer surface.

A34. The fastener alignment system of paragraph A33, wherein the rigid transfer structure includes a rigid transfer plate.

A35. The fastener alignment system of any of paragraphs A33-A34, wherein the rigid transfer structure includes a plurality of transfer structure recesses arranged in the predetermined fastening location pattern, wherein each transfer structure recess in the plurality of transfer structure recesses is shaped to at least partially receive a corresponding fastener in the plurality of fasteners upon transfer of the plurality of fasteners from the fastener orienting structure to the fastener alignment tool.

A36. The fastener alignment system of any of paragraphs A1-A35, wherein the transfer structure includes a transfer roller configured to press against the fastener alignment tool to selectively transfer the plurality of fasteners from the fastener orienting structure to the fastener alignment tool.

A37. The fastener alignment system of paragraph A36, wherein the transfer roller includes at least one of:
 (i) a rigid transfer roller; and
 (ii) a flexible transfer roller.

A38. The fastener alignment system of any of paragraphs A1-A37, wherein the transfer structure includes a transfer structure index configured to align the transfer structure with the fastener alignment tool during transfer of the plurality of fasteners from the fastener orienting structure to the fastener alignment tool.

A39. The fastener alignment system of paragraph A38, wherein the transfer structure index defines a predetermined transfer orientation between the transfer structure and the fastener alignment tool.

A40. The fastener alignment system of any of paragraphs A1-A39, wherein the plurality of fasteners includes a plurality of frangible collar nuts.

A41. The fastener alignment system of paragraph A40, wherein the fastener alignment system includes the plurality of frangible collar nuts.

A42. The fastener alignment system of any of paragraphs A40-A41, wherein each frangible collar nut in the plurality of frangible collar nuts includes:

(i) a threaded region defining a threaded receptacle configured for threaded engagement with a corresponding fastening location in the plurality of fastening locations of the manufactured assembly;

(ii) an engagement region configured to engage with a driver; and (iii) a frangible region that extends between the threaded region and the engagement region.

A43. The fastener alignment system of paragraph A42, wherein the frangible region operatively attaches the threaded region and the engagement region.

A44. The fastener alignment system of any of paragraphs A42-A43, wherein the frangible region is configured to shear upon application of a predetermined torque between the threaded region and the engagement region.

A45. The fastener alignment system of any of paragraphs A42-A44, wherein the threaded region includes a female threaded region.

A46. The fastener alignment system of any of paragraphs A42-A45, wherein the engagement region includes a hexagonal body configured to engage with the driver.

A47. The fastener alignment system of any of paragraphs A40-A46, wherein each frangible collar nut in the plurality of frangible collar nuts further includes a sealing structure configured to form a fluid seal between the frangible collar nut and the manufactured assembly.

A48. The fastener alignment system of paragraph A47, wherein the sealing structure includes at least one of a polymeric sealing structure and a polytetrafluoroethylene sealing structure.

A49. The fastener alignment system of any of paragraphs A40-A48, wherein each frangible collar nut includes a first end region, a second end region, and a neck region, wherein a neck diameter, or an effective neck diameter, of the neck region is less than a first diameter, or a first effective diameter of the first end region and is also less than a second diameter, or a second effective diameter, of the second end region.

A50. The fastener alignment system of paragraph A49, wherein the fastener alignment tool is configured to selectively retain the plurality of fasteners via operative engagement with the neck region.

A51. The fastener alignment system of any of paragraphs A49-A50, wherein the fastener alignment tool is configured to release each frangible collar nut upon shearing of the neck region.

B1. A kit of components configured to operatively engage a plurality of fasteners with a corresponding plurality of fastening locations arranged, on a manufactured assembly, in a predetermined fastening location pattern, the kit comprising:

a fastener orienting structure;
a fastener alignment tool;
a transfer structure; and
the plurality of fasteners.

B2. The kit of paragraph B1, wherein the kit further includes a driver configured to engage the plurality of fasteners with the plurality of fastening locations.

B3. The kit of paragraph B2, wherein the driver includes at least one of:

(i) a nut driver;
(ii) a right angle nut driver;
(iii) an electric driver; and
(iv) a pneumatic driver.

B4. The kit of any of paragraphs B1-B3, wherein the fastener orienting structure includes any suitable component and/or feature of the fastener orienting structure of the fastener alignment system of any of paragraphs A1-A51.

B5. The kit of any of paragraphs B1-B4, wherein the fastener alignment tool includes any suitable component and/or feature of the fastener alignment tool of the fastener alignment system of any of paragraphs A1-A51.

B6. The kit of any of paragraphs B1-B5, wherein the transfer structure includes any suitable component and/or feature of the transfer structure of the fastener alignment system of any of paragraphs A1-A51.

B7. The kit of any of paragraphs B1-B6, wherein the plurality of fasteners includes any suitable component and/or feature of the plurality of fasteners of the fastener alignment system of any of paragraphs A1-A51.

C1. A method of aligning a plurality of fasteners with a plurality of fastening locations, wherein the plurality of fastening locations is arranged on a manufactured assembly and in a predetermined fastening location pattern, the method comprising:

orienting the plurality of fasteners on a fastener orienting structure and in the predetermined fastening location pattern;

operatively engaging a fastener alignment tool with the fastener orienting structure, wherein the fastener alignment tool includes a plurality of fastener alignment receptacles arranged in the predetermined fastening location pattern, and further wherein the operatively engaging includes operatively engaging such that the plurality of fastener alignment receptacles is aligned with the plurality of fasteners;

transferring the plurality of fasteners from the fastener orienting structure to the fastener alignment tool, wherein the transferring includes:

(i) receiving each fastener in the plurality of fasteners within a corresponding fastener alignment receptacle in the plurality of fastener alignment receptacles; and (ii) selectively retaining each fastener within the corresponding fastener alignment receptacle;

separating the fastener alignment tool from the fastener orienting structure while retaining the plurality of fasteners within the plurality of fastener alignment receptacles;

aligning the fastener alignment tool with the plurality of fastening locations, wherein the aligning includes contacting the plurality of fasteners with the plurality of fastening locations; and attaching the plurality of fasteners to the plurality of fastening locations.

C2. The method of paragraph C1, wherein the fastener orienting structure includes a plurality of fastener orienting regions, and further wherein the orienting includes placing a corresponding fastener in the plurality of fasteners at each fastener orienting region of the plurality of fastener orienting regions.

C3. The method of paragraph C2, wherein the plurality of fastener orienting regions includes a plurality of fastener orienting receptacles, and further wherein the orienting includes placing the corresponding fastener in the plurality of fasteners within each fastener orienting receptacle in the plurality of fastener orienting receptacles.

C4. The method of any of paragraphs C2-C3, wherein the plurality of fastener orienting regions includes a plurality of fastener orienting projections, and further wherein the orienting includes placing the corresponding fastener in the plurality of fasteners at least partially around each fastener orienting projection in the plurality of fastener orienting projections.

C5. The method of any of paragraphs C1-C4, wherein the operatively engaging includes operatively engaging at a predetermined relative orientation between the fastener alignment tool and the fastener orienting structure.

C6. The method of any of paragraphs C1-05, wherein the fastener orienting structure includes a fastener orienting structure surface, wherein the orienting the plurality of fasteners includes orienting the plurality of fasteners on the fastener orienting structure surface, wherein the fastener alignment tool includes a fastener alignment tool surface configured to face toward the manufactured assembly during the aligning and also during the attaching, and further wherein the operatively engaging includes operatively engaging such that the fastener orienting surface faces toward the fastener alignment tool surface.

C7. The method of any of paragraphs C1-C6, wherein the transferring includes utilizing a transfer structure.

C8. The method of any of paragraphs C1-C7, wherein the transferring includes pressing the fastener orienting structure and the fastener alignment tool toward one another.

C9. The method of any of paragraphs C1-C8, wherein the transferring includes elastically deforming at least a region of the fastener alignment tool to facilitate the selectively retaining.

C10. The method of any of paragraphs C1-C9, wherein the separating includes moving the fastener alignment tool and the fastener orienting structure away from one another.

C11. The method of any of paragraphs C1-C10, wherein the fastener alignment tool includes an indicia configured to indicate a location, within the manufactured assembly, that includes the plurality of fastening locations, and further wherein the aligning includes coarse aligning the fastener alignment tool with the manufactured assembly utilizing the indicia.

C12. The method of any of paragraphs C1-CU, wherein the aligning includes fine aligning the fastener alignment tool with the manufactured assembly via initial engagement between the plurality of fasteners and the plurality of fastening locations.

C13. The method of any of paragraphs C1-C12, wherein the attaching includes tightening the plurality of fasteners onto the plurality of fastening locations.

C14. The method of any of paragraphs C1-C13, wherein the attaching includes rotating the plurality of fasteners to attach the plurality of fasteners to the plurality of fastening locations.

C15. The method of any of paragraphs C1-C14, wherein the attaching includes utilizing a driver.

C16. The method of any of paragraphs C1-C15, wherein each fastener in the plurality of fasteners includes a threaded region, an engagement region, and a frangible region, which extends between the threaded region and the engagement region, wherein the attaching includes rotating each fastener, via engagement with the engagement region, to thread the threaded region onto a corresponding fastening location in the plurality of fastening locations, and further wherein the attaching includes shearing the frangible region responsive to greater than a threshold torque between the threaded region and the engagement region.

C17. The method of paragraph C16, wherein the method further includes releasing each fastener from the fastener alignment tool responsive to the shearing.

C18. The method of any of paragraphs C1-C17, wherein the method is performed utilizing any suitable structure of any of the fastener alignment systems of any of paragraphs A1-A51.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A fastener alignment system comprising:
a fastener orienting structure configured to orient a plurality of fasteners in a predetermined fastening location pattern;
a fastener alignment tool configured to operatively engage with the fastener orienting structure at a predetermined relative orientation, wherein the fastener alignment tool includes a plurality of fastener alignment receptacles arranged in the predetermined fastening location pattern, wherein each fastener alignment receptacle is configured to:
(i) receive a corresponding fastener in the plurality of fasteners from the fastener orienting structure; and
(ii) selectively retain the corresponding fastener; and
a transfer structure configured to selectively transfer the plurality of fasteners from the fastener orienting structure to the fastener alignment tool when the fastener alignment tool is operatively engaged with the fastener orienting structure at the predetermined relative orientation;
wherein, subsequent to receipt of the plurality of fasteners, the fastener alignment tool is configured to operatively engage the plurality of fasteners with a corresponding plurality of fastening locations arranged, on a manufactured assembly, in the predetermined fastening location pattern; and
wherein the transfer structure is configured to elastically deform at least a portion of the fastener alignment tool to selectively transfer the plurality of fasteners from the fastener orienting structure to the fastener alignment tool.

2. The fastener alignment system of claim 1, wherein the fastener orienting structure includes a plurality of fastener orienting regions, wherein each of the plurality of fastener orienting regions is configured to orient a corresponding fastener of the plurality of fasteners at a corresponding location within the predetermined fastening location pattern.

3. The fastener alignment system of claim 1, wherein the fastener orienting structure further includes a fastener orienting structure index configured to align the fastener orienting structure and the fastener alignment tool at the predetermined relative orientation.

4. The fastener alignment system of claim 1, wherein the fastener orienting structure further includes an access structure configured to facilitate separation of the fastener alignment tool from the fastener orienting structure subsequent to transfer of the plurality of fasteners from the fastener orienting structure to the fastener alignment tool.

5. The fastener alignment system of claim 1, wherein the fastener alignment tool includes a plurality of retention structures, wherein each retention structure in the plurality of retention structures is associated with a corresponding fastener alignment receptacle of the plurality of fastener alignment receptacles and is configured to selectively retain the corresponding fastener within the corresponding fastener alignment receptacle.

6. The fastener alignment system of claim 5, wherein the plurality of retention structures includes a plurality of resilient projections that project at least partially across the plurality of fastener alignment receptacles.

7. The fastener alignment system of claim 5, wherein the plurality of retention structures is configured to deform to permit receipt of the plurality of fasteners within the plurality of fastener alignment receptacles.

8. The fastener alignment system of claim 1, wherein the fastener alignment tool includes indicia configured to indicate a location, within the manufactured assembly, that includes the plurality of fastening locations.

9. The fastener alignment system of claim 1, wherein, when the fastener alignment tool is operatively engaged with the fastener orienting structure at the predetermined relative orientation, each fastener in the plurality of fasteners is aligned with a corresponding fastener alignment receptacle in the plurality of fastener alignment receptacles.

10. The fastener alignment system of claim 1, wherein the transfer structure is configured to selectively press the fastener alignment tool and the fastener orienting structure toward one another to selectively transfer the plurality of fasteners from the fastener orienting structure to the fastener alignment tool.

11. The fastener alignment system of claim 1, wherein the transfer structure includes a transfer structure index configured to align the transfer structure with the fastener alignment tool during transfer of the plurality of fasteners from the fastener orienting structure to the fastener alignment tool.

12. The fastener alignment system of claim 1, wherein the plurality of fasteners includes a plurality of frangible collar nuts, wherein each frangible collar nut includes a first end region, a second end region, and a neck region, wherein a neck of the neck region is less than a first diameter of the first end region and is also less than a second diameter of the second end region, and further wherein the fastener alignment tool is configured to selectively retain the plurality of fasteners via operative engagement with the neck region.

13. The fastener alignment system of claim 12, wherein the fastener alignment tool is configured to release each frangible collar nut upon shearing of the neck region.

14. A kit of components configured to operatively engage a plurality of fasteners with a corresponding plurality of fastening locations arranged, on a manufactured assembly, in a predetermined fastening location pattern, the kit comprising:
the fastener alignment system of claim 1; and
the plurality of fasteners.

15. A method of aligning a plurality of fasteners with a plurality of fastening locations, wherein the plurality of fastening locations is arranged on a manufactured assembly and in a predetermined fastening location pattern, the method comprising:
- orienting the plurality of fasteners on a fastener orienting structure and in the predetermined fastening location pattern;
- operatively engaging a fastener alignment tool with the fastener orienting structure, wherein the fastener alignment tool includes a plurality of fastener alignment receptacles arranged in the predetermined fastening location pattern, and further wherein the operatively engaging includes operatively engaging such that the plurality of fastener alignment receptacles is aligned with the plurality of fasteners;
- transferring the plurality of fasteners from the fastener orienting structure to the fastener alignment tool, wherein the transferring includes:
  (i) receiving each fastener in the plurality of fasteners within a corresponding fastener alignment receptacle in the plurality of fastener alignment receptacles;
  (ii) selectively retaining each fastener within the corresponding fastener alignment receptacle; and
  (iii) elastically deforming at least a region of the fastener alignment tool to facilitate the selectively retaining;
- separating the fastener alignment tool from the fastener orienting structure while retaining the plurality of fasteners within the plurality of fastener alignment receptacles;
- aligning the fastener alignment tool with the plurality of fastening locations, wherein the aligning includes contacting the plurality of fasteners with the plurality of fastening locations; and
- attaching the plurality of fasteners to the plurality of fastening locations.

16. The method of claim 15, wherein the fastener orienting structure includes a plurality of fastener orienting regions, and further wherein the orienting includes placing a corresponding fastener in the plurality of fasteners at each fastener orienting region of the plurality of fastener orienting regions.

17. The method of claim 15, wherein the transferring includes pressing the fastener orienting structure and the fastener alignment tool toward one another utilizing a transfer structure.

18. The method of claim 15, wherein each fastener in the plurality of fasteners includes a threaded region, an engagement region, and a frangible region, which extends between the threaded region and the engagement region, wherein the attaching includes rotating each fastener, via engagement with the engagement region, to thread the threaded region onto a corresponding fastening location in the plurality of fastening locations, wherein the attaching includes shearing the frangible region responsive to greater than a threshold torque between the threaded region and the engagement region, and further wherein the method includes releasing each fastener from the fastener alignment tool responsive to the shearing.

19. A fastener alignment system comprising:
- a fastener orienting structure configured to orient a plurality of fasteners in a predetermined fastening location pattern;
- a fastener alignment tool configured to operatively engage with the fastener orienting structure at a predetermined relative orientation, wherein the fastener alignment tool includes a plurality of fastener alignment receptacles arranged in the predetermined fastening location pattern, wherein the fastener alignment tool also includes a plurality of retention structures, wherein each retention structure of the plurality of retention structures is associated with a corresponding fastener alignment receptacle of the plurality of fastener alignment receptacles and is configured to selectively retain a corresponding fastener of the plurality of fasteners within the corresponding fastener alignment receptacle, wherein the plurality of retention structures includes a plurality of resilient projections that project at least partially across the plurality of fastener alignment receptacles, and further wherein each fastener alignment receptacle of the plurality of fastener alignment receptacles is configured to:
  (i) receive the corresponding fastener from the fastener orienting structure; and
  (ii) selectively retain the corresponding fastener; and
- a transfer structure configured to selectively transfer the plurality of fasteners from the fastener orienting structure to the fastener alignment tool when the fastener alignment tool is operatively engaged with the fastener orienting structure at the predetermined relative orientation;
- wherein, subsequent to receipt of the plurality of fasteners, the fastener alignment tool is configured to operatively engage the plurality of fasteners with a corresponding plurality of fastening locations arranged, on a manufactured assembly, in the predetermined fastening location pattern.

20. The fastener alignment system of claim 19, wherein the plurality of retention structures is configured to deform to permit receipt of the plurality of fasteners within the plurality of fastener alignment receptacles.

* * * * *